(12) United States Patent
Ee et al.

(10) Patent No.: US 10,679,652 B2
(45) Date of Patent: Jun. 9, 2020

(54) PARTIAL ETCHED POLYIMIDE FOR NON-CONDUCTIVE ADHESIVE CONTAINMENT

(71) Applicant: Magnecomp Corporation, Murrieta, CA (US)

(72) Inventors: Kuen Chee Ee, Chino, CA (US); Sitthipong Footrakul, Wangnoi (TH); Thana Meesomphop, Wangnoi (TH)

(73) Assignee: Magnecomp Corporation, Murrieta, CA (US)

( * ) Notice: Subject to any disclaimer, the term of this patent is extended or adjusted under 35 U.S.C. 154(b) by 0 days.

(21) Appl. No.: 16/214,967

(22) Filed: Dec. 10, 2018

(65) Prior Publication Data

US 2019/0198047 A1    Jun. 27, 2019

Related U.S. Application Data

(60) Provisional application No. 62/609,128, filed on Dec. 21, 2017.

(51) Int. Cl.
| | | |
|---|---|---|
| *G11B 5/48* | (2006.01) | |
| *G11B 5/55* | (2006.01) | |
| *G11B 5/31* | (2006.01) | |

(52) U.S. Cl.
CPC ............. *G11B 5/484* (2013.01); *G11B 5/483* (2015.09); *G11B 5/4826* (2013.01); *G11B 5/5552* (2013.01); *G11B 5/31* (2013.01)

(58) Field of Classification Search
CPC ............................. G11B 5/483; G11B 5/5552
USPC ...................... 360/244.1, 244.2, 244.3, 245.2
See application file for complete search history.

(56) References Cited

U.S. PATENT DOCUMENTS

| | | | | |
|---|---|---|---|---|
| 6,856,075 B1 * | 2/2005 | Houk | ................... | H01L 41/313 310/348 |
| 7,218,481 B1 * | 5/2007 | Bennin | ................ | G11B 5/4826 360/244.2 |
| 8,248,731 B2 * | 8/2012 | Fuchino | ................. | G11B 5/486 310/323.06 |
| 8,630,067 B2 * | 1/2014 | Ando | ................... | G11B 5/4826 360/294.4 |
| 9,296,188 B1 * | 3/2016 | Cray | ................... | B32B 37/1207 |
| 9,311,938 B1 * | 4/2016 | Ee | ........................... | G11B 5/483 |
| 9,741,376 B1 * | 8/2017 | Ee | ............................. | G11B 5/56 |
| 9,979,176 B2 * | 5/2018 | Tachi | ..................... | H01B 7/282 |

(Continued)

*Primary Examiner* — Jefferson A Evans
(74) *Attorney, Agent, or Firm* — DLA Piper LLP (US)

(57) ABSTRACT

Embodiments of an adhesive containment structure are provided herein. The suspension includes a base portion that includes a metal support layer, an insulation layer including an insulating material on the metal support layer, and a signal conductor layer. The suspension includes a gimbaled portion, a microactuator adhered to the support layer. The suspension also includes an adhesive containment structure, the adhesive containment structure includes a first portion of the insulating material, a second portion of the insulating material, and a third portion of the insulating material, the first and second portions of the insulating material being separated by a gap, and the third portion of the insulating material disposed within the gap. Adhesive is disposed within the gap of the adhesive containment structure, the adhesive adhering the microactuator to the third portion of the insulating material.

18 Claims, 5 Drawing Sheets

(56) References Cited

U.S. PATENT DOCUMENTS

| | | | |
|---|---|---|---|
| 2002/0075606 A1* | 6/2002 | Nishida | G11B 5/5552 360/294.4 |
| 2012/0002329 A1* | 1/2012 | Shum | G11B 5/4873 360/294.4 |
| 2012/0091857 A1* | 4/2012 | Ikeji | G11B 5/4873 310/323.17 |
| 2014/0118863 A1* | 5/2014 | Nesori | G11B 5/4826 360/244.7 |
| 2015/0348577 A1* | 12/2015 | Hagiya | H01L 41/042 360/294.4 |
| 2016/0086625 A1* | 3/2016 | Berscheit | G11B 5/4846 360/294.4 |
| 2019/0067550 A1* | 2/2019 | Mou | F04B 39/121 |

\* cited by examiner

FIG. 6

PARTIAL ETCHED POLYIMIDE FOR NON-CONDUCTIVE ADHESIVE CONTAINMENT

CROSS-REFERENCE TO RELATED APPLICATIONS

This application claims priority from U.S. Provisional Patent Application No. 62/609,128, filed on Dec. 21, 2017, which is hereby incorporated by reference in its entirety.

FIELD

Embodiments of the invention relate generally to disk drive head suspensions and flexures.

BACKGROUND

Figure 1:
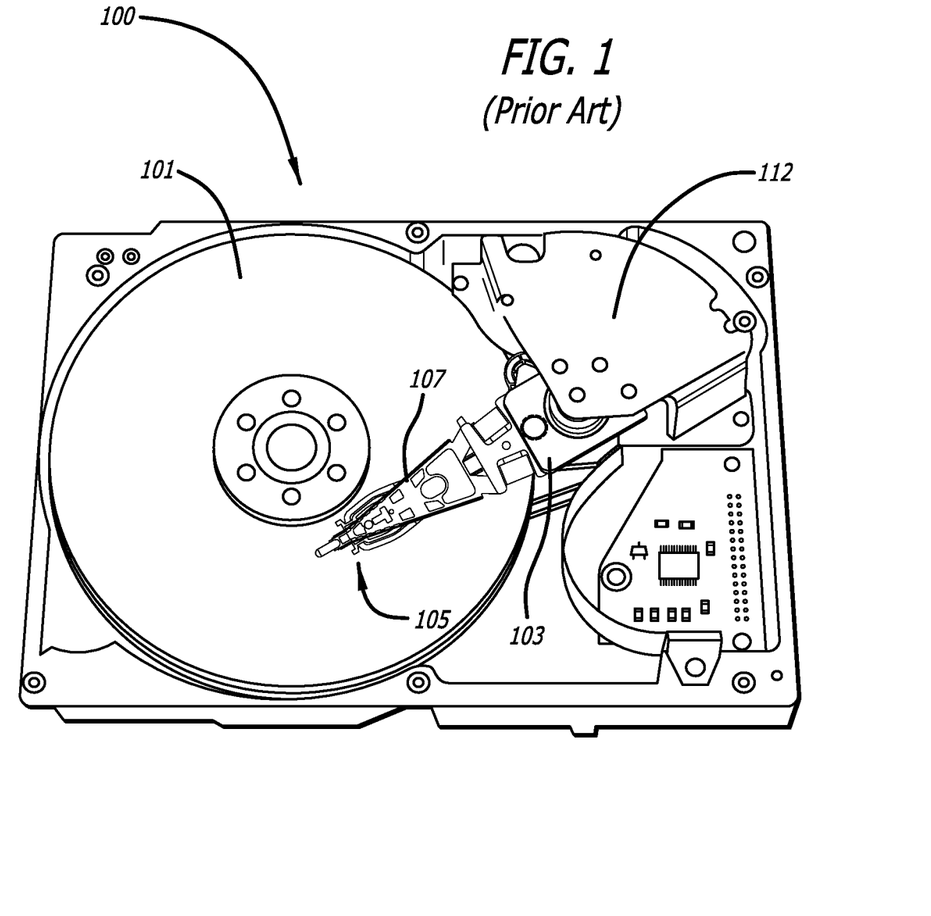
FIG. 1 illustrates an oblique view of a prior art disk driving having a dual stage actuated suspension.

Magnetic hard disk drives and other types of spinning media drives such as optical disk drives are well known. FIG. 1 illustrates an oblique view of a current hard disk drive and suspension. The disk drive unit 100 includes a spinning magnetic disk 101 containing a pattern of magnetic ones and zeroes on it that constitutes the data stored on the disk drive. The magnetic disk is driven by a drive motor (not shown). Disk drive unit 100 further includes a disk drive suspension 105 to which a magnetic head slider (not shown) is mounted proximate a distal end of load beam 107. The proximal end of a suspension or load beam is the end that is supported, i.e., the end nearest the base plate which is swaged or otherwise mounted to an actuator arm 103. The distal end of a suspension or load beam is the end that is opposite the proximal end, i.e., the distal end is the cantilevered end.

Suspension 105 is coupled to actuator arm 103, which in turn is coupled to a voice coil motor 112 that moves the suspension 105 arcuately in order to position the head slider over the correct data track on data disk 101. The head slider is carried on a gimbal which allows the slider to pitch and roll so that it follows the proper data track on the disk, allowing for such variations as vibrations of the disk, inertial events such as bumping, and irregularities in the disk's surface.

Both single stage actuated disk drive suspensions and dual stage actuated (DSA) suspension are known. In a single stage actuated suspension, only voice coil motor 112 moves suspension 105.

In a DSA suspension, in addition to voice coil motor 112 which moves the entire suspension, at least one microactuator is located on the suspension in order to effect fine movements of the magnetic head slider to keep it properly aligned over the data track on the spinning disk. The microactuator(s) provide much finer control and much higher bandwidth of the servo control loop than does the voice coil motor alone, which effects relatively coarse movements of the suspension and hence the magnetic head slider. A piezoelectric element, sometimes referred to simply as a PZT, is often used as the microactuator motor, although other types of microactuator motors are possible. In the discussion that follows, for simplicity the microactuator may be referred to simply as a "PZT" although it will be understood that the microactuator need not be of the PZT type.

Figure 2:
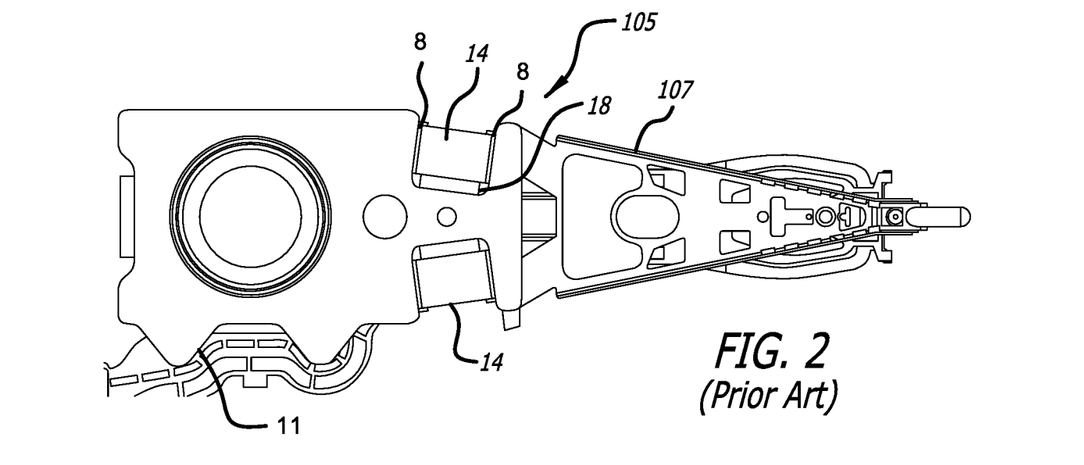
FIG. 2 illustrates a top plan view of the suspension of FIG. 1.

FIG. 2 illustrates a top plan view of the prior art suspension 105 in FIG. 1. Two PZT microactuators 14 are affixed to suspension 105 on microactuator mounting shelves 18 that are an integral part of the load beam 107, such that the PZTs span respective gaps in base plate 11. Microactuators 14 are affixed to mounting shelves 18 by non-conductive epoxy 8 at each end of the microactuators. The positive and negative electrical connections can be made from the PZTs to the suspension's flexible wiring trace and/or to the grounded base plate by a variety of techniques.

There remains a continuing need for improved suspensions. Suspensions with enhanced performance capabilities are desired. The suspensions should be capable of being efficiently manufactured.

SUMMARY

Embodiments of an adhesive containment structure for a suspension are provided herein. The suspension includes a base portion that includes a metal support layer, an insulation layer comprising an insulating material on the metal support layer, and a signal conductor layer on the insulation layer. The suspension also includes a gimbaled portion on which a transducer head is mounted, a microactuator adhered to the support layer, the microactuator configured to effect fine movements of the transducer head disposed on the gimbaled portion. The suspension also includes an adhesive containment structure, the adhesive containment structure includes a first portion of the insulating material, a second portion of the insulating material, and a third portion of the insulating material, the first and second portions of the insulating material being separated by a gap, and the third portion of the insulating material disposed within the gap. Adhesive is disposed within the gap of the adhesive containment structure, the adhesive adhering the microactuator to the third portion of the insulating material.

Other features and advantages of embodiments of the present invention will be apparent from the accompanying drawings and from the detailed description that follows.

BRIEF DESCRIPTION OF THE DRAWINGS

Embodiments of the present invention are illustrated by way of example and not limitation in the figures of the accompanying drawings, in which like references indicate similar elements and in which.

DETAILED DESCRIPTION

Disk drive head suspensions with non-parallel motors including load beams and flexures according to embodiments are illustrated in the attached drawing figures and described herein. Embodiments of a flexure include one or more of the following features: a support layer, an insulation layer disposed on the support layer, and a signal conductor layer disposed on the insulation layer. The suspension also includes a flexure that includes a gimbaled portion on which a transducer head is mounted; a microactuator adhered to the support layer, the microactuator configured to effect fine movements of the transducer head disposed on the gimbaled portion. The suspension also includes an adhesive containment structure, the adhesive containment structure includes a first portion of the insulating material, a second portion of the insulating material, and a third portion of the insulating material, the first and second portions of the insulating material are configured to define a gap between the first portion and the second portion, and the third portion of the insulating material disposed within the gap. Adhesive is disposed within the gap of the adhesive containment structure, the adhesive adhering the microactuator to the third portion of the insulating material.

Embodiments of the adhesive containment structure include the partial etched insulation layer that serves as a protective layer to avoid an electrical short between the conductive epoxy and the portion of the stainless steel layer; and also between the conductive epoxy and the bottom electrode of the PZT. The insulation layer may be formed of an insulating material including, but not limited to, polyimide, another polymer, or other non-conducting material.

Figure 3A:
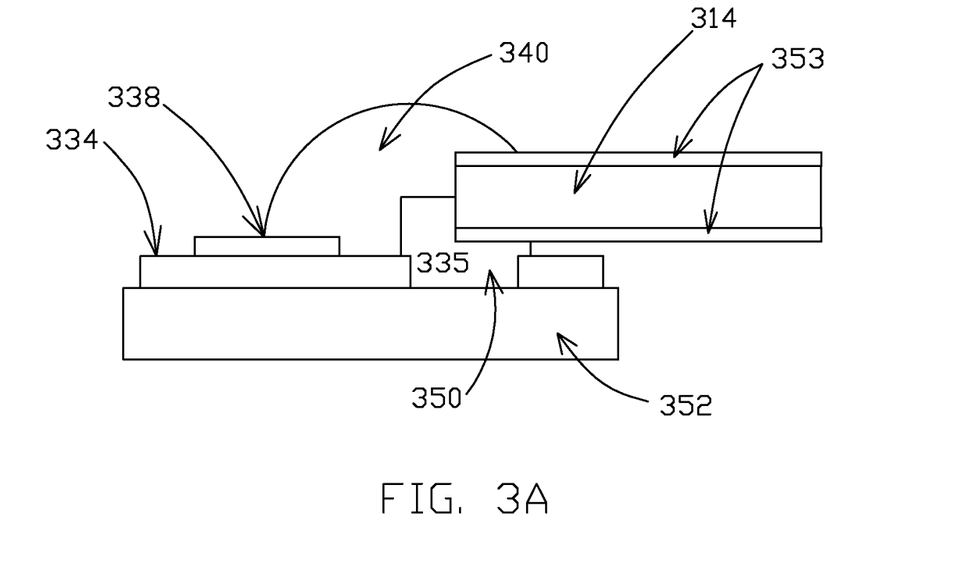
FIG. 3A illustrates a sectional view of a PZT microactuator and its physical and electrical connections of a conventional design.
Figure 3B:
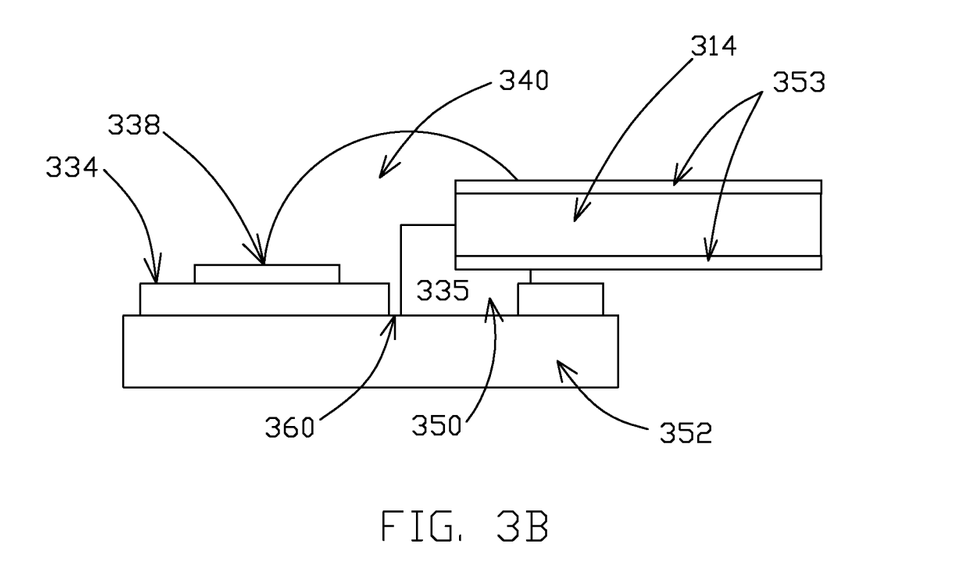
FIG. 3B illustrates a sectional view of a PZT microactuator and its physical and electrical connections of a conventional design.

Referring now to FIGS. 3A and 3B. FIG. 3A illustrates a sectional view of the PZT microactuator including electrodes 353 and its physical and electrical connections of a conventional design. A side of a PZT 314 as viewed in FIG. 3A is affixed to a fixed portion 352 of a flexure of a suspension. A non-conductive epoxy 350 can adhere the PZT 314 to the fixed portion 352. Enough non-conductive epoxy 350 must be dispensed in order to fill in the via 335 to prevent a short circuit when a conductive epoxy 340 is deposited. Because of the difficulties in controlling the manufacturing process, the non-conductive adhesive 350 can intrude undesirably across left and right polyimide layers 334. Non-conductive epoxy 350 can be drawn out of the via 335 and above the polyimide layer 334 by a combination of the wicking effect between the surfaces of polyimide 334 and the bottom surface of PZT 314, too much non-conductive epoxy 350 being dispensed into the via 335, and/or the PZT 314 being pressed down too far into the non-conductive epoxy 350 during assembly.

When too little non-conductive epoxy is dispensed, as illustrated in FIG. 3B, this results in a void 360 formed between the non-conductive epoxy 350 and the polyimide layers 334, which exposes the fixed portion 352 that allows the conductive epoxy 340 to contact the fixed portion 352 and creating a short circuit. Thus, the ability to manufacture this conventional design without a short circuit is difficult, which affects results in low manufacturing yields or expensive techniques and equipment to increase the tolerances of the manufacturing processes.

Figure 4:
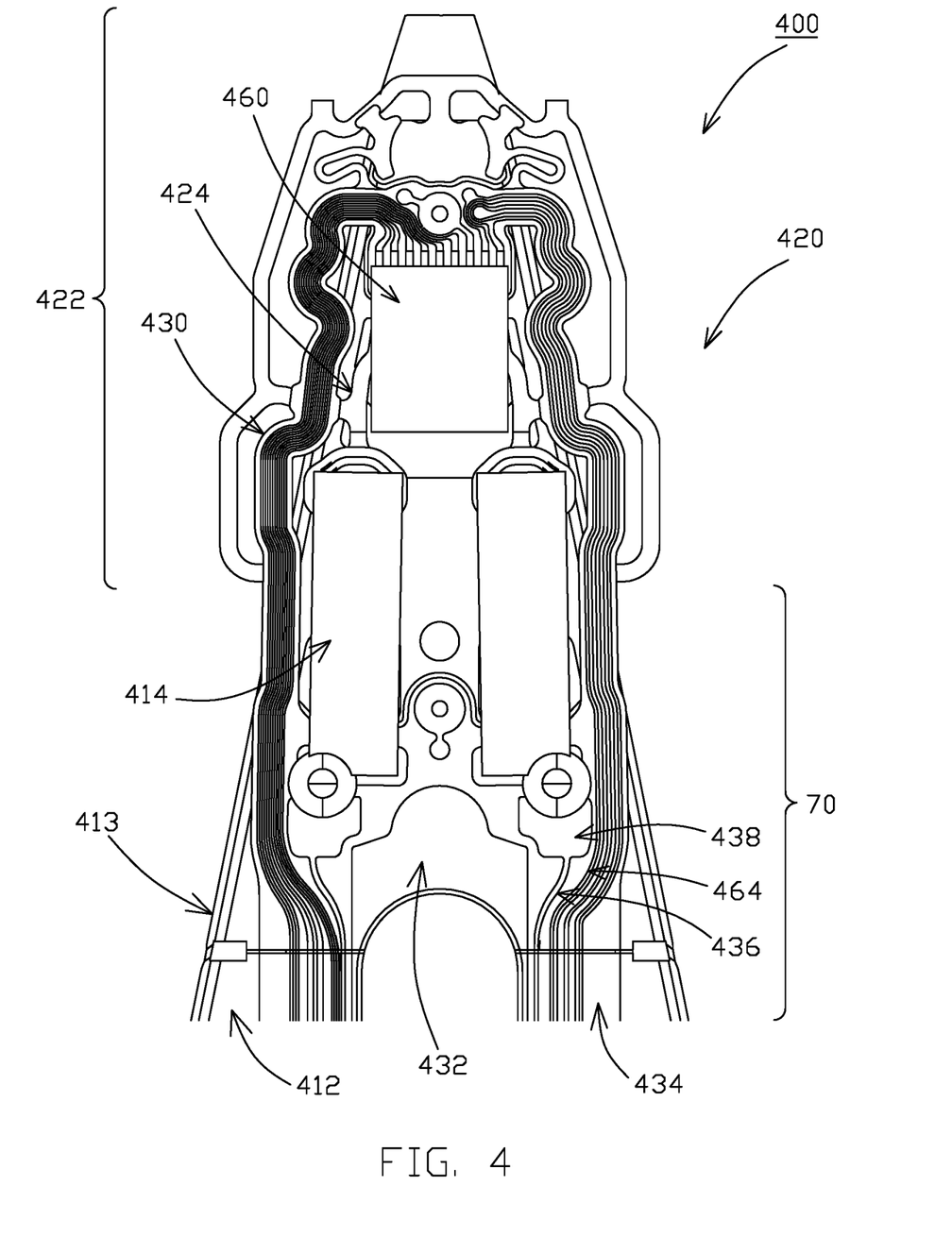
FIG. 4 illustrates a top plan view of a distal end of a suspension including an adhesive containment structure according to an embodiment.

FIG. 4 illustrates a plan view of the suspension including an adhesive containment structure according to an embodiment. The suspension 400 can include a load beam 412. The load beam 412 can include a stiffening structure that enhances rigidity of the load beam 412. In some exemplary embodiments, the stiffening structure includes upturned edge rails 413 that enhance the stiffness of the load beam 412. A flexure 420 can be mounted to the underside of the load beam 412. In some embodiments, the flexure 420 can be mounted using known processes, such as by laser spot welding. The flexure 420 can be mounted to the underside of the load beam to the side that is closest to the disk platter.

The flexure 420 can also include a gimbaled portion 422 and a flexible circuit 430. It is conventional, but not necessary that the gimbaled portion 422 and the flexible circuit 430 are manufactured together. The gimbaled portion 422 can include a slider tongue to which a head slider 460 is attached. The head slider 460 rides an air bearing created by a boundary layer wind, which is caused by the spinning disk platter. The gimbal allows the gimbaled portion 422 to pitch, yaw, and roll freely in response to irregularities in the spinning disk platter surface. The head slider 460 is located entirely on the underside of load beam 412.

The flexure 420 can include a support layer 432, such as a stainless steel support layer. The flexure 420 can also include an insulating layer 434, such as a polyimide layer. Moreover, the flexure 420 can include a conductive layer 436 which is typically copper or copper alloy. Individual copper signal conductors 464 formed from conductive layer 436 can be configured to carry the various signals including drive and sense signals to and from the head slider, and to carry the activation voltage for the PZT 414. In some embodiments, the insulation layer 434 forms a void in a selected area to form a via thereby exposing the layer below such as the support layer 432 of flexure 420. The conductive layer 436 of the flexure 420 also includes contact pads 438 configured to receive a PZT 414. Each contact pad 438 is coupled with one or more conductors of the conductor layer 436 to provide signals to a PZT 414, such as activation voltage.

Figure 5:
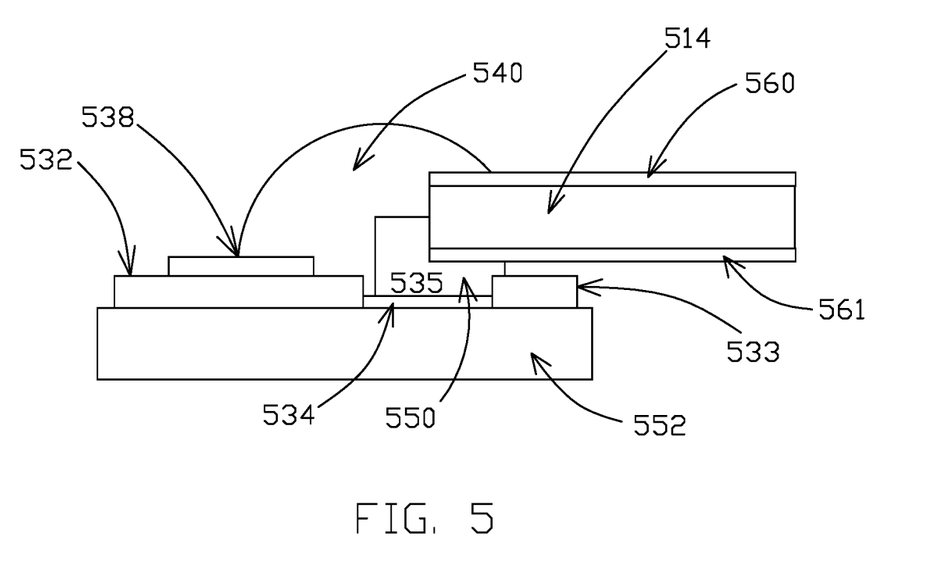
FIG. 5 illustrates a sectional view of an adhesive containment structure according to an embodiment, taken along section line A-A' in FIG. 4.

FIG. 5 illustrates a sectional view of an adhesive containment structure according to an embodiment, taken along section line A-A' in FIG. 4. As shown in FIG. 5, the electrical connection for the PZT driving voltage is made by conductive adhesive 540 being applied so as to extend from the top surface of PZT 514 to a copper contact pad 538. The adhesive thereafter being hardened by a curing process at high temperature. Conductive adhesive 540 thus forms an electrical bridge from the contact pad 538 to the top side which is the driven electrode of PZT 514. A via 535 is formed in the insulation layer 534, to create an adhesive containment structure into which a non-conductive adhesive such as non-conductive adhesive 550 is dispensed. The adhesive containment structure, according to various embodiments, includes a first insulation section 532 on one side, a second insulation section 533 on a second side, and a partial etched insulation layer 534, each of which is disposed on the portion 552 of the support layer 432 (of FIG. 4).

The first insulation section 532 can be configured as a first insulating wall. The first insulating wall can be configured to rise up from the metal support layer (portion 552 of the support layer) toward the microactuator. The second insulation section 533 can be configured as a second insulating wall. The first insulating wall and second insulating wall can be configured to form a gap. The gap can define a channel between the first insulating wall and second insulating wall. The channel can include an insulating material floor formed from the insulating material. The insulating material floor formed from the insulating material is shown as the partial etched insulation layer 534.

A first end of a PZT 514 is affixed to the load beam 412 (shown in FIG. 4), such as by non-conductive adhesive 550, for example non-conductive epoxy. In alternative embodiments, the first end of the PZT 414, as illustrated in FIG. 4, is affixed to a relatively fixed portion of flexure 420, such as a support layer 432. Referring back to FIG. 5, a non-conductive adhesive 550 can adhere the PZT 514 to the insulation layer 534. A partial etched insulation layer 534 is configured to be beneath the non-conductive adhesive 550. By implementing the partial etched polyimide layer 534 beneath the non-conductive adhesive 550, the portion 552 of the support layer 532 can be insulated from the non-conductive adhesive 550 and the conductive adhesive 540.

According to some embodiments, an electrical connection is established from the top surface of the PZT 514, which serves as the driven electrode to the contact pad 538 disposed on the polyimide layer 532. The electrical connection for the PZT driving voltage is made by conductive adhesive 540 applied so as to extend from the top surface of the PZT 14 to the contact pad 538. The conductive adhesive 540, according to various embodiments, thereafter is hardened by a curing process at high temperature using techniques including those known in the art. The conductive epoxy 540 thus forms an electrical bridge from the contact pad 538 to the top side of the PZT 514, which includes the electrode 560 of PZT 514. The partial etched polyimide layer 534 serves as a pocket for the non-conductive adhesive 550 to fill up, and ideally slightly overflow onto the insulation layer 534. Thus, even in the event the non-conductive adhesive 550 is drawn out of the via 535 and above the insulation layer 532, the partial etched insulation layer 532 serves as a protective layer to avoid an electrical short circuit between the conductive adhesive 540 and the portion 552 of the support layer.

The PZT 514 is grounded at its ground electrode 561, which is located on the bottom side of the PZT 514 according to some embodiments. Referring to both FIGS. 4 and 5, a portion 70 of the flexure 420 is fixed to the load beam 412 (shown in FIG. 4) such as by welding of the stainless steel body of the load beam 412 to the stainless steel layer 432 (shown in FIG. 3) of flexure 420. Portion 70 of the flexure 420 is therefore fixed. While the gimbaled portion 422 (shown in FIG. 4) of the flexure 420 is gimbaled so as to move relatively freely with respect to load beam 412. PZT 414 is connected to and extends from the relatively fixed portion 70 of the flexure 420 to a relatively movable gimbaled portion 422 which includes the gimbal on which head slider 460 is mounted. In this way, actuation of the PZT 414 affects fine movements of the head slider 460. In the embodiment illustrated in FIG. 4, the distal end of PZT 414 is affixed to stainless steel arm 424, and which is part of, or connects to, the gimbaled region 422.

Figure 6:
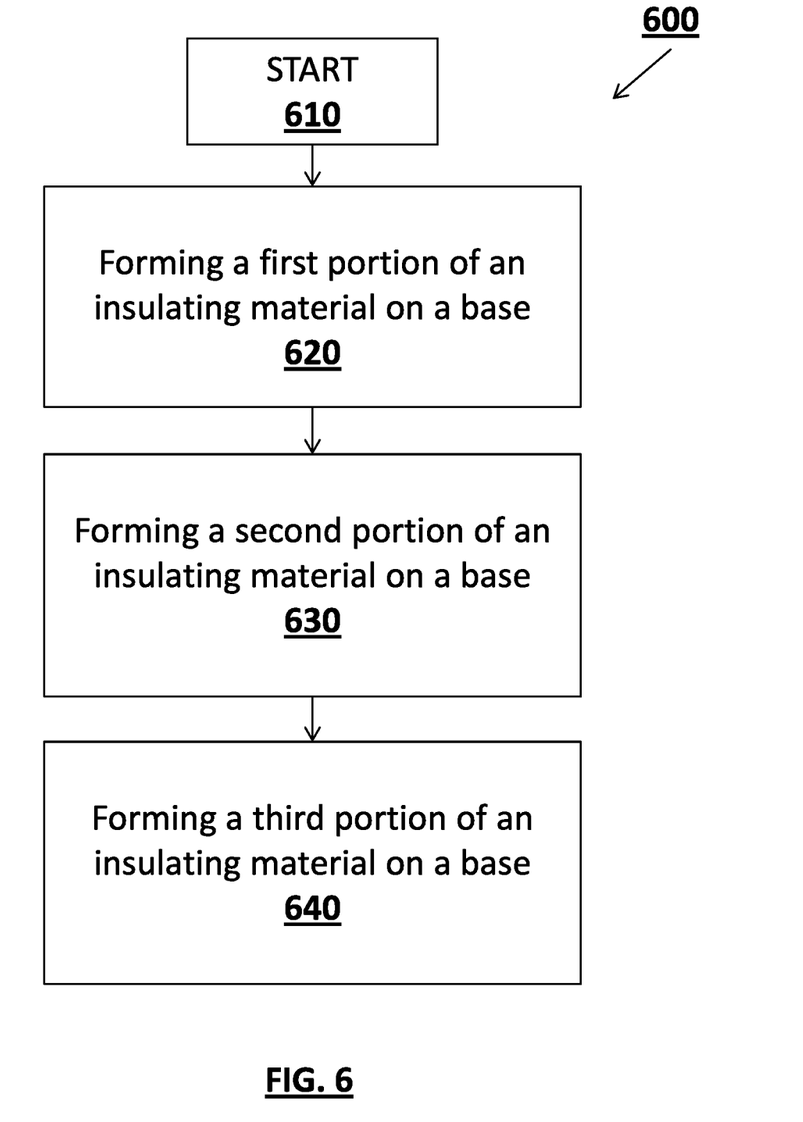
FIG. 6 illustrates a process flow diagram for forming an adhesive containment structure for a suspension according to an embodiment.

FIG. 6 illustrates a process flow diagram 600 for forming an adhesive containment structure for a suspension according to an embodiment. The method 600 starts at 610. At 620, a first portion of an insulating material is formed on a base. The method 600 advances 630, where a second portion of the insulating material is formed on the base. Moreover, at 640, a third portion of the insulating material is formed on the base. As indicated in FIG. 5, the adhesive containment structure, according to various embodiments, includes a first insulation section 532 on one side, a second insulation section 533 on a second side, and a partial etched insulation layer 534, each of which is disposed on the portion 552 of the support layer 532.

The first portion and the second portion of the insulating material are separated by a gap. The third portion of the insulating material is disposed within the gap. The gap is configured to receive adhesive within the gap of the adhesive containment structure to adhere to a microactuator to the third portion of the insulating material.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." The word "coupled", as generally used herein, refers to two or more elements that may be either directly connected, or connected by way of one or more intermediate elements. Likewise, the word "connected", as generally used herein, refers to two or more elements that may be either directly connected, or connected by way of one or more intermediate elements. Where the context permits, words in the above Detailed Description using the singular or plural number may also include the plural or singular number respectively. The word "or" in reference to a list of two or more items, that word covers all of the following interpretations of the word: any of the items in the list, all of the items in the list, and any combination of the items in the list.

Moreover, conditional language used herein, such as, among others, "can," "could," "might," "can," "e.g.," "for example," "such as" and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment.

What is claimed is:

1. A suspension comprising:
    an adhesive containment structure disposed on a support layer, the adhesive containment structure including
        a first portion of insulating material,
        a second portion of the insulating material, and
        a third portion of the insulating material, the first portion and the second portion of the insulating material are separated by a gap, and the third portion of the insulating material is disposed within the gap and connected to the first portion and the second portion; and
    adhesive disposed within the gap of the adhesive containment structure, the adhesive adhering a microactuator to the third portion of the insulating material, the third portion of the insulating material is in between the adhesive and the support layer.

2. The suspension of claim 1, wherein the gap is configured to extend from underneath the microactuator to an area that is not underneath the microactuator.

3. The suspension of claim 1, wherein the adhesive is located within the gap of the adhesive containment structure, on a top surface of the third portion of the insulating material.

4. The suspension of claim 1, wherein the third portion of the insulating material is adhered to the support layer.

5. The suspension of claim 1, further comprising a conductive adhesive configured to extend from a top surface of the microactuator to an electrical contact pad.

6. A suspension comprising:
    a flexure including a support layer, an insulation layer disposed on the support layer, and a conductive layer disposed on the insulation layer;
    a gimbaled portion on which a transducer head is mounted;
    a microactuator adhered to the support layer by adhesive, the adhesive including a first mass of adhesive, the microactuator configured to effect fine movements of the transducer head disposed on the gimbaled portion;

a first insulating wall including insulating material of the insulation layer and at least in partial contact to the first mass of adhesive adhering a first end of the microactuator to the flexure, the first insulating wall configured to extend from the metal support layer toward the microactuator;

a second insulating wall formed at least in part from the insulating material, the second insulating wall configured to extend from the metal support layer, the first insulating wall and second insulating wall are configured to form a gap such that the gap defines a channel between the first insulating wall and the second insulating wall, the channel including an insulating material floor between the adhesive and the support layer and formed from the insulating material.

7. The suspension of claim 6, wherein the first insulating wall and the second insulating wall are configured to extend generally transversely to a longitudinal axis of the suspension.

8. The suspension of claim 6, wherein the channel is configured to extend from underneath the microactuator to an area that is not underneath the microactuator.

9. The suspension of claim 6, wherein the adhesive is located within the channel, on a top surface of the insulating material floor.

10. The suspension of claim 6, wherein the insulating material floor is adhered to the support layer.

11. The suspension of claim 6, further comprising a conductive adhesive extending from a top surface of the microactuator to a contact pad of the conductive layer.

12. A suspension comprising:
a flexure including a metal support layer and an insulation layer formed of an insulating material, the insulation layer disposed on the metal support layer;
a microactuator; and
an adhesive configured to adhere the microactuator to the suspension, the adhesive at least partly contained by a first wall of the insulating material formed underneath the microactuator, the insulating material including a second wall and configured to define a channel between the first wall and the second wall, the adhesive disposed within the channel and connected to the first wall and the second wall of the insulating material, the channel is between the adhesive and the support layer.

13. A suspension comprising:
an adhesive containment structure disposed on a support layer, the adhesive containment structure including:
a first portion of the insulating material,
a second portion of the insulating material, and
a third portion of the insulating material,
the first portion and the second portion of the insulating material are configured to form a gap between the first portion and the second portion, and
the third portion of the insulating material is disposed within the gap between the adhesive and the support layer and connected to the first portion and the second portion, the gap configured to receive adhesive to adhere a microactuator to the third portion of the insulating material.

14. A method of forming an adhesive containment structure for a suspension comprising:
forming a first portion of an insulating material on a support layer;
forming a second portion of the insulating material on the support layer such that the first portion and second portion of the insulating material are separated by a gap;
forming a third portion of the insulating material configured to be between an adhesive and the support layer, disposed within the gap and connected to the first portion and the second portion, the gap is configured to receive the adhesive to adhere a microactuator to the third portion of the insulating material.

15. The method of claim 14, wherein forming the first portion and the second portion includes depositing an insulating material on the support layer.

16. The method of claim 15, wherein forming the third portion includes etching the insulating material to form the gap between the first portion and the second portion while maintaining a portion of the insulation material in the gap between the first portion and the second portion.

17. The method of claim 14, wherein forming the third portion includes etching the insulating material to expose a portion of the support layer to form the gap between the first portion and the second portion and depositing a second insulating material in the gap such that the a top surface of the second insulating material is below a top surface of the first portion and a top surface of the second portion.

18. The method of claim 17, wherein the insulating material and the second material are both polyimide.

* * * * *